INVENTORS
Peter Schultz &
Werner Auer

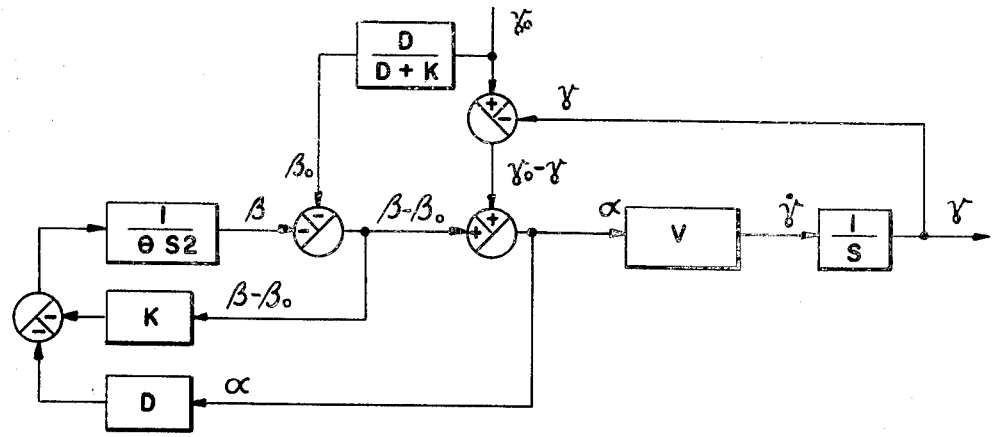
FIG. 1.
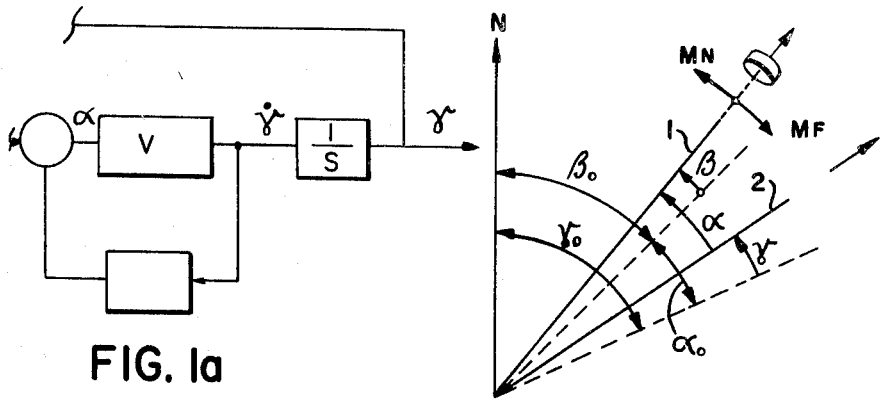
FIG. 1a
FIG. 2.
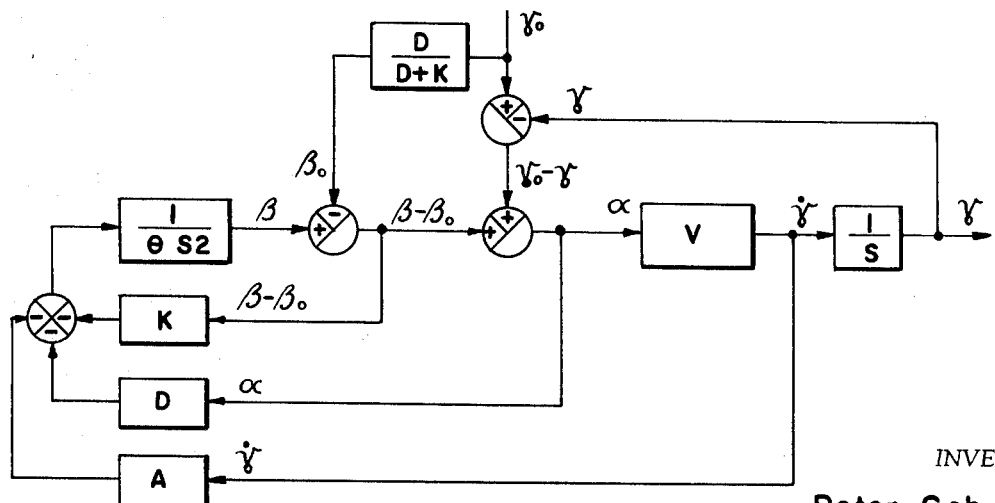
FIG. 3.

BY *Spencer & Kaye*

ATTORNEYS

United States Patent Office 3,518,771
Patented July 7, 1970

3,518,771
NORTH-SEEKING GYROSCOPE
Peter Schultz, Heidelberg, and Werner Auer, Heidelberg-Wieblingen, Germany, assignors to Teldix Luftfahrt - Ausrustungs G.m.b.H., Heidelberg - Wieblingen, Germany
Filed July 18, 1967, Ser. No. 654,248
Claims priority, application Germany, July 22, 1966,
T 31,655
Int. Cl. G10c 19/38
U.S. Cl. 33—226                                  8 Claims

ABSTRACT OF THE DISCLOSURE

A north-seeking gyro including a frame member journalled within a housing for rotation about a first axis, a gimbal member journalled within the frame member for rotation about a second axis which is co-planar with the first axis and which is inclined at a relatively small angle of inclination thereto, a rotor journalled within the gimbal member for rotation about a third axis which is substantially perpendicular to the second axis, and a servomotor responsive to the angle between the gimbal member and the frame member for rotating the frame member with regard to the housing to compensate for changes in the relative position of the gimbal member and the frame member. In its rest position, the axis of the rotor is preferably perpendicular to the plane defined by the first and second axes, and the angle between the second axis and the first axis as measured from the second axis to the first axis extends in the same direction as the direction of rotation of the rotor.

BACKGROUND OF THE INVENTION

The present invention relates generally to a north-seeking gyro and more particularly to the known type of north-seeking gyro containing a highly sensitive rate gyro which is disposed in such a manner that it measures the horizontal component of the earth's rate of rotation and which is turned by a servomotor until the spin axis of the gyro is parallel to the horizontal component of the earth's rate of rotation.

In this known north-seeking gyro, the servomotor is included in a servoloop which contains, in addition to the servomotor, an angular displacement pickoff between the gimbal or rotor casing of the gyro and in which the gimbal or rotor casing is mounted, an electronic amplifier coupled to the input of the servomotor, and a gear mechanism coupled to the output of the servomotor. The angular position of the output shaft of the gear mechanism represents the time integral of the angle sensed by the angular angle pick-off.

FIG. 1 of the drawings is a block diagram of a known north-seeking gyro in which the legends within the individual blocks are transfer functions illustrated in the frequency range according to the Laplace-transformation. The complex variant (Laplace operator) is $s$. For every block of FIG. 1, the product of the input value and the legend within the block is equal to the output value. The block circiut diagram also contains summation points, which are represented as small circles, and branching points, which are represented as solid dots. For each of the summation circles, the algebraic sum of the input signals, according to the polarity within the summation circle, is equal to the output signals.

FIG. 2 illustrates the angles noted in the block diagram of FIG. 1, where N signifies geographical north, the numeral 1 signifies the axis of the rotor, and the numeral 2 signifies the north marker of the frame of the gyroscope. The latter is parallel to the rotor axis when it is in the rest or zero position. As usual, the above-mentioned angular angle pick-off does not furnish a potential in this position. At the beginning of the north-seeking process, the rotor axis and the north marker form the angles $\beta_0$ and $\gamma_0$ with the north direction, corresponding to the initial orientation indicated in FIG. 2 by the broken lines. These two angles form together with the initial misalignment $\alpha_0$ of the gimbal with reference to the frame the following equation: $\alpha_0 = \gamma_0 - \beta_0$.

The momentary positon $\beta$ and $\gamma$ of rotor axis and north marker during alignment into the north direction is measured from the initial position to the north direction. The velocities and accelerations are correspondingly directed. The momentary alignment of the frame is thus:

(I) $$\alpha = \gamma_0 - \beta_0 - \gamma + \beta$$

The block diagram circuit of FIG. 1 is based on the assumption that the output shaft of the rate gyro employed, i.e., the major axis of the gimbal, is practically without friction. This is achieved by suspending the gimbal in the frame on a gas bearing. A damping depending on the alignment velocity therefore need not be considered. Two moments rather are acting on the gimbal: the north-driving moment and the restoring moment of the rate gyro spring which elastically restrains the gimbal in the case and which is completely relaxed in the zero position. The north-driving moment is:

(I$\alpha$) $$M_N = H\omega \cos \varphi \sin (\beta - \beta)$$
$$= k \sin (\beta - \beta) \approx k (\beta_0 - \beta)$$

wherein H represents the angular momentum of the rotor, $\omega$ is the earth's rate of rotation and $\varphi$ is the geographic latitude. The values H, $\omega$ and cos $\varphi$ are combined in the constant $k$. It is further possible in this application, in which the main concern is the behavior during transition to the north direction, to replace the sine with the angle. The spring moment $M_F = D\alpha$ with the spring constant D counteracts the north-driving moment. Both of the moments $M_N$ and $M_F$ are shown in FIG. 2 to be acting on the rotor axis.

The sum of the moments $M_N$ and $M_F$ imparts a rotational acceleration $\ddot\beta$ leading in notherly direction to the gimbal. If a moment of inertia $\theta$ is assumed for the gimbal around its major axis, which also encompasses the rotor, its suspension, etc., the following equation applies:

(I$b$) $$\theta\ddot\beta = k(\beta_0 - \beta) - D\alpha$$

The spring moment must be inserted with a minus sign since its direction is opposite to the direction of the north-driving moment. Transformed and reduced to zero, this equation becomes:

(II) $$\theta s^2 \beta - k(\beta_0 - \beta) + D\alpha = 0$$

The servoloop transforms the misalignment $\alpha$ of the gimbal into an angular velocity $\dot\gamma$ of the frame. The amplifying behavior of the electronic amplifier, of the motor and of the transmission, assumed to be proportional in combination, namely the so-called amplification V, forms the interconnection factor (II$a$) $$\dot\gamma = \alpha V$$

If one does not consider the velocity, but the angle of the frame at a certain moment, this angle—as already mentioned above—is the integral of the frame velocity over time from the beginning of the transient stage to the moment of observation, i.e.

(II$b$) $$\gamma = \int \dot\gamma \, dt$$

Transformed, this becomes (IIc) $$\gamma = \frac{1}{S}\dot{\gamma}$$

or, considering the above-mentioned equation for $\dot{\gamma}$ (III) $$\gamma = \frac{V}{s}\alpha$$

Before the start of the transient stage, i.e., before connecting the servoloop, the moment equilibrium is set at the gimbal by means of the north-driving moment and the moment of the gimbal spring. Now:

$$M_N = M_F$$

(IIIa) $$k \sin \beta_0 = D\alpha_0 = D(\gamma_0 - \beta_0)$$

It is concluded then, if $\sin \beta_0$ is again replaced by $\beta_0$, that (IV) $$\beta_0 = \frac{D}{D+k}\gamma_0$$

The block diagram of FIG. 1 does not contain anything other than the relationships given in the Equations I to IV above. The equations can be easily deduced from the block diagram of FIG. 1 with application of the above-mentioned mathematical rules, which proves the accuracy of this representation as a multiloop control system.

The initially set angle $\gamma_0$ is now to be considered as an independent variable and the angle $\gamma$ as a dependent variable. The system comes to rest when $\gamma$ has become equal to $\gamma_0$, from which it can of course be deduced that $\beta$ equals $\beta_0$ and that $\gamma$ equals zero. From the Equations I to IV, the sequential frequency course F can be calculated by eliminating the variables $\alpha$ and $\beta$ as well as the initial constant $\beta_0$ depending on $\gamma_0$. Therefore:

(IVa) $$F = \frac{\gamma}{\gamma_0} = \frac{1 + \frac{\theta s^2}{k+D}}{1 + \underbrace{\frac{k+D}{kV}s}_{T_1} + \underbrace{\frac{\theta}{k}s^2}_{T_2} + \frac{\theta}{kV}s^3}$$

If the term in the denominator which contains $s$ is called $T_1$ and the term in the denominator containing $s^2$ is called $T_2$, the term (IVb) $$\frac{T_1}{2\sqrt{T_2}} = D^*$$

represents a characteristic value for the damping of the system, as long as $$\frac{\theta}{kV} \ll \frac{\theta}{k}$$

This, however, is the case here since $V \gg 1$. If this damping characteristic $D^*$, commonly used in the control art, equals 1, this signifies critical damping. Since this critical damping, which is characterized by the aperiodic transient, i.e. the shortest possible period of transient response without overshoot, is desired for a north-seeking gyro, the following requirement results:

(IVc) $$V = V_{aD} = \frac{D+k}{2\sqrt{\theta k}}$$

$V_{ap}$ is the so-called aperiodic amplification which must be provided in the servoloop in order to achieve the shortest possible period of transient response without overshooting.

The above-described prior art north-seeking gyro does not exactly align itself with true north, due to the actuating threshold of the servomotor and other factors. It is possible, however, to reduce the actuating threshold of the servomotor indirectly and thus to increase the north accuracy by increasing the amplification V. But this amplification is fixedly determined, as already noted, because of the requirement for aperiodic alignment. The prior art practice was therefore to gradually increase the amplification only after completion of the aperiodic alignment or towards the end of this stage.

SUMMARY OF THE INVENTION

The principal object of this invention is to increase the accuracy of a north-seeking gyro in spite of the above-noted contradictory requirement for the amplification V. This is achieved according to the present invention by using the gyro itself to form a velocity-proportional feedback. In this way, it is possible to arbitrarily preset the amplification without the transient behavior being deprived of its characteristic of critical damping.

It is known that the forward amplification of a servoloop can be increased with the addition of a negative feedback without thereby changing the total amplification factor. In the present case, this would mean that the velocity furnished by the servoloop is fed back to the input of the loop as shown in FIG. 1a, a fragmentary figure showing a modified portion of FIG. 1. This feedback would contain a tachogenerator which furnishes a velocity-proportional potential in the opposite direction to the potential of the angle pick-off. In practice this solution, however, is not workable because such a feedback must be highly exact in order not to cause errors itself which would be greater than the north error to be corrected. In view of the low correcting velocities appearing in the vicinity of north, it is not possible to manufacture suitable tachogenerators with reasonable expenditures.

Therefore, in accordance with this invention, means are provided to let the restoring velocity act on the rate gyro itself and thus to create a moment which counteracts the north-driving moment. This is done by inclining the major axis of the gimbal at a relatively small angle to the major axis of the frame member within which the gimbal is journalled. In its rest position, the axis of the rotor journalled within the gimbal is preferably perpendicular to the plane defined by the major axes of the gimbal and the frame member. Also, the angle between the gimbal and the frame member major axes, as measured from the gibal axis to the frame axis, extends in the same direction as the direction of rotation of the rotor.

BRIEF DESCRIPTION OF THE DRAWINGS

FIG. 1 is a block diagram of a prior art north-seeking gyro circuit.

FIG. 1a is a fragmentary diagram of a modification of the right hand portion of the circuit of FIG. 1.

FIG. 2 is a schematic representation of the angles noted in the block diagram of FIG. 1.

FIG. 3 is a block diagram of a north-seeking gyro circuit according to the present invention.

DESCRIPTION OF THE PREFERRED EMBODIMENTS

One embodiment of the invention is illustrated by the block diagram in FIG. 3, which differs from that of FIG. 1 only in that the feedback loop according to the present invention contains a block marked A. It is sufficient for the time being to imagine that the output value of this block is a moment proportional to $\dot{\gamma}$. The following equation can be read from the circuit diagram:

(V) $$[-k(\beta - \beta_0) - D\alpha - A\dot{\gamma}]\frac{1}{\theta s^2} = \beta$$

The signals arriving at the summation point are listed in the brackets. Multiplied by $1/\theta s^2$, they result in the angle $\beta$. This equation corresponds to Equation II enlarged by the term $A\dot{\gamma}$. From Equation V, together with the still valid Equations I, II and IV, the frequency sequence of the system can be deduced as follows:

$$(Va) \qquad F = \frac{\gamma}{\gamma_0} = \frac{1 + \frac{\theta s^2}{k+D}}{1 + \frac{k+D+AV}{KV} s + \frac{\theta}{k} s^2 + \frac{\theta}{Vk} s^3}$$

Damping in this case is $$(Vb) \qquad D^* = \frac{\frac{k+D+AV}{kV}}{2\sqrt{\frac{\theta}{k}}} \text{ as long as } \frac{\theta}{Vk} \ll \frac{\theta}{k}, \text{ i.e., } V \gg 1$$

If $D^*$ is made to equal 1, then $$(Vc) \qquad V_{ap} = \frac{D+k}{2\sqrt{\theta k} - A}$$

Here the possibility is given to select $V_{ap}$ of arbitrary value as long as the feedback A is selected to correspond.

The feedback effect according to the present invention results from the fact that the major axis of the gimbal and the major axis of the frame member within which the gimbal is journalled are permanently inclined toward each other at a small angle of inclination in such a manner that the plane defined by these axes, when the gimbal is in its zero position, is perferably perpendicular to the rotor axis and that the angular sense of direction of the inclination angle defined from the gimbal axis to the frame axis coincides with the sense of rotation of the rotor.

If the major axes of the gimbal and frame members are in such a plane that when the gimbal is in its zero position the rotor axis is not perpendicular to the frame axis, the desired damping effect can still occur as long as at least the sense of direction of rotation meets the above-mentioned requirement. These deviations from the optimum which, however, cause unfavorable side effects (asymmetrical transient behavior) will be discussed in detail with the aid of an example. All possibilities for the realization of the present invention, however, are encompassed in the always valid requirement that the gimbal axis and the frame axis lie in such a plane that a follow-up velocity component results which counteracts the full force of the earth's rate component on the gyro.

Figure 4:
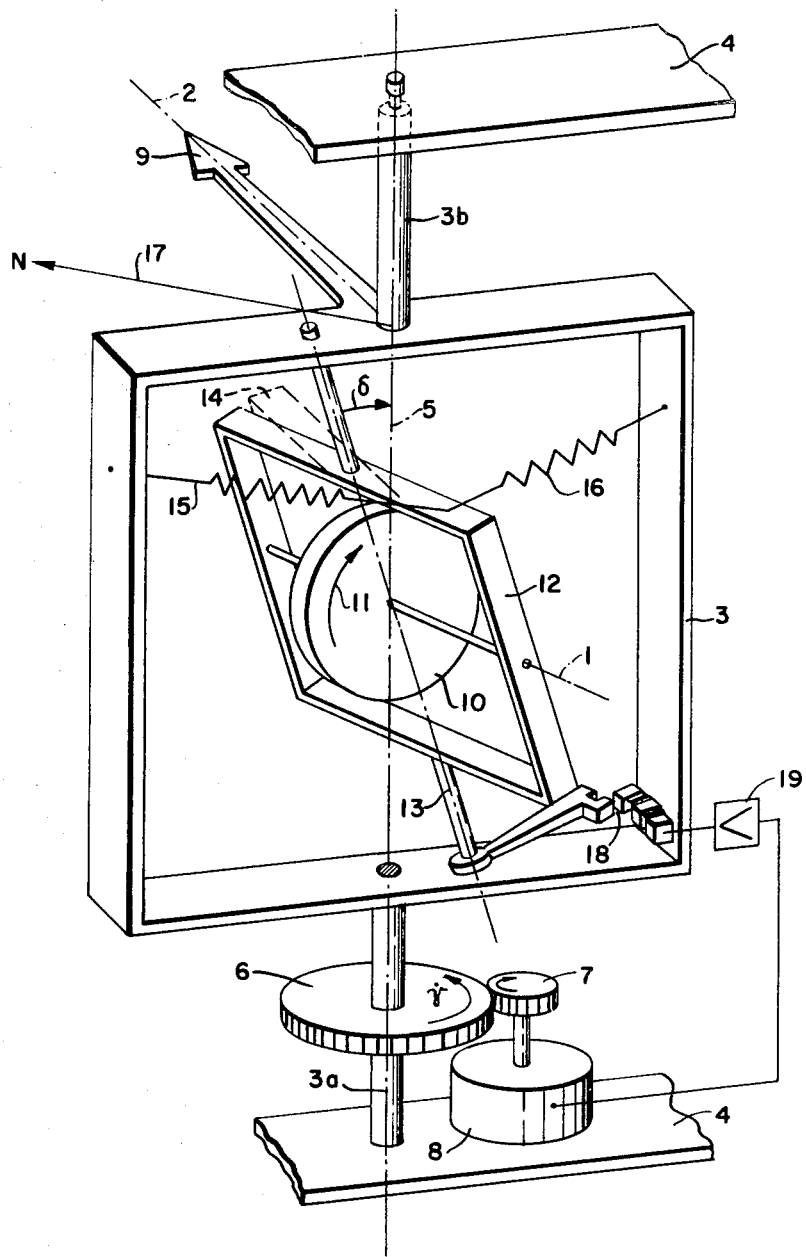
FIG. 4 is a schematic perspective view of a north-seeking gyro corresponding to the circuit shown in FIG. 3.

In FIG. 4, the so-called frame 3 is drawn in rectangular form. It is pivotably mounted by means of two studs 3a and 3b to the vehicle in a housing 4 indicated only by horizontal segments and is pivotable around the perpendicularly disposed frame axis 5. The frame is driven via gears 6 and 7 by a servomotor 8 mounted on the housing. Instead of the conventional compass card, an arrow marker 9 is provided on the frame for reasons of simplicity. This marker defines the frame reference axis 2 and points to geographic north when the gyro has passed the transient period. The gyro rotor 10 whose axis is marked 1 and whose direction of rotation is marked by arrow 11, rotates in a gimbal 12, whose axis 13 forms an angle of inclination $\delta$ with the axis 5. When the gyro is in its rest position, the gimbal 12 will normally be in the zero position 14 indicated by dashed lines in FIG. 4. The rotor axis 1 then is parallel to axis 2. Thus the angle is zero. In this position the gimbal is held by two tension springs 15 and 16. The geographic north direction is indicated in FIG. 4 by arrow 17. Due to the north-driving moment being exerted on the gimbal, the illustrated misalignment of the gimbal around its axis 13 results, which is picked up by the two-part angle pick-off 18 and is fed to the servomotor 8 via an amplifier 19. The angle pick-off 18, amplifier 19, and servomotor 8 comprise an automatic servoloop for rotating the frame member to compensate for changes in the relative position of the gimbal and frame member.

Figure 5:
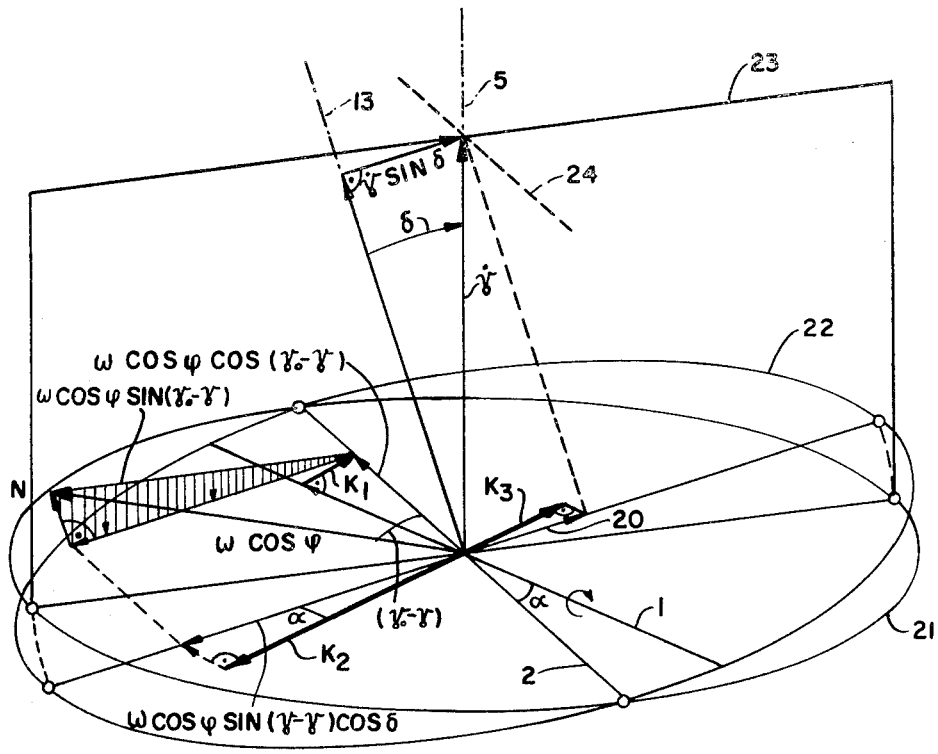
FIG. 5 is a spatial vector diagram of the angular relationships illustrated in FIG. 4.

FIG. 5 illustrates the individual velocity components acting on the gyro shown in FIG. 4, i.e., the components perpendicular to the rotor axis 1 as well as to the gimbal axis 13. The position of the various axes is the same as in FIG. 4. The major axis of the frame is again marked 5 and the frame reference axis perpendicular thereto is marked 2 and is drawn to emanate from the center of the drawing. If the frame rotates around axis 5, the frame reference axis 2 defines a plane 21 whereas the gyro input axis vector 20 describes a plane 22 when the gimbal precesses around axis 13.

Essentially the gyro is influenced by two velocities illustrated as vectors, namely the horizontal component $\omega \cos \varphi$ of the earth's rate of rotation and the angular velocity $\gamma$ of the frame, which latter lies in the direction of the frame axis 5. In plane 21, the vector $\omega \cos \varphi$ must first be divided into a component $\omega \cos \varphi \cos (\gamma_0 - \gamma)$ in the direction of axis 2 and into a component $\omega \cos \varphi \sin (\gamma - \gamma)$ perpendicular thereto. In plane 22, $\omega \cos \varphi \cos (\gamma - \gamma)$ is now divided into a component in the direction of the spin axis, which is ineffective, and into a component $K_1$ perpendicular to the spin axis. $\omega \cos \varphi \sin (\gamma - \gamma)$ can be divided into a component parallel to the gimbal axis 13, which consequently has no effect on the gyro, and into a component $\omega \cos \varphi \sin (\gamma - \gamma) \cos \delta$, which lies in plane 22. This component is now displaced parallel to itself into the center axis of plane 22 and again divided into a component in the direction of the spin axis, which is ineffective, and a component $K_2$ perpendicular to the spin axis. Finally, the frame velocity $\gamma$ must be divided into a component in the direction of the gimbal axis, which is also ineffective, and into a component $\gamma \sin \delta$ perpendicular thereto. This component is displaced in the parallel direction into the center axis of plane 22 and is then divided into an ineffective component parallel to the spin axis and into a component $K_3$ perpendicular to the spin axis.

Thus, the following angular velocities are sensed by the gyro:

(a) $\omega_K = K_2 - K_1 - K_3$
$= \omega \cos \varphi \sin (\gamma_0 - \gamma) \cos \delta \cos \alpha - \omega \cos \varphi \cos (\gamma_0 - \gamma) \sin \alpha - \gamma \sin \delta \cos \alpha$ Since the axis alignment angle $\delta$ according to the present invention is relatively small, e.g. two minutes, the equation can further be simplified by the insertion of cos $\delta \approx 1$ and sin $\delta \approx \delta$:

(b) $\omega_K = \omega \cos \varphi \{\sin (\gamma_0 - \gamma) \cos \alpha - \cos (\gamma_0 - \gamma) \sin \alpha\} - \delta \cos \alpha$
$= \omega \cos \varphi \sin (\gamma_0 - \gamma - \alpha) - \gamma \delta \cos \alpha$
$= \omega \cos \varphi \sin (\beta_0 - \beta) - \gamma \delta \cos \alpha$ If the same simplification is also applied for cos $\alpha$ (in a device constructed for practical use $\alpha$, e.g., is 2°) and for sin $(\beta_0 - \beta)$ the following results:

(c) $\omega_K = \omega \cos \varphi (\beta_0 - \beta) - \gamma \delta$

Multiplied with the angular momentum H, a new total moment acting on the gimbal axis 13 results. Here the following equation applies:

(d) $H\omega \cos \varphi (\beta_0 - \beta) - H\delta \gamma - D\alpha = \theta s^2 \beta$ If $H\omega \cos \varphi = k$, this equation exactly corresponds to Equation V derived with the aid of the block diagram of FIG. 3, and it can be seen that the product $H\delta$ of angular momentum and axis inclination angle takes the place of the feedback value A.

Thus it is proven that the inclination of the gimbal axis with respect to the frame axis shown in FIGS. 4 and 5 creates the desired feedback effect. This effect is linearly dependent on the axis inclination angle $\delta$.

If, contrary to FIG. 5, the inclination of the two axes in question is such that the axis 13 falls out of the indicated plane 23, a portion of the feedback value will become dependent on sin α, which creates an asymmetrical transient stage with reference to the northerly direction, i.e., the transient action becomes faster from the one side than from the other side. If finally the upper end of the gimbal axis 13 falls on the other side of line 24, a parallel to the frame reference axis, the set requirement for the direction of the axis inclination angle δ is no longer met. The feedback then acts as positive feedback and causes overshooting.

To be exact, the vertical component ω sin φ of the earth's rotation must also be considered.

Since it acts in the same direction as γ, it can easily be seen that the component (e)    $K_4 = \omega \sin \varphi \sin \delta \cos \alpha$ thereof has an effect on the gyro. The angle α, which as already mentioned is normally limited to 2°, permits the approximation cos α≈1. Thus the component $K_4$ is constantly effective on the gyro. It causes a constant deviation from true north in the instrument, which here has the value of δ, i.e., approximately two minutes. A constant error correction, however, can be incorporated into the calibration. The effect of this component $K_4$ on the transient period is negligibly small.

In a further embodiment of the present invention it is proposed to use a proportionally acting correcting element instead of the integrator-servomotor for follow-up action on the case. Such a correcting element is, for example, a pull or rotational magnet with caging springs. This case is of interest for north-seeking instruments in which north is preset and which therefore operate within a small angular range. In order to be able to preset north, the housing 4 receives a reference direction which is not shown in the figures and which is determined by markers on the housing and which in the zero position is parallel to the frame reference axis 2. With this marker, the housing is first roughly aligned toward north, the approximate northerly direction being derived, for example, from a magnetic compass. The system with proportional follow-up has the advantage that it operates with a very low actuating threshold and thus has a relatively high north accuracy.

In a further embodiment of the present invention, it is proposed to use a doubly integrating correcting element, e.g., a circularly (360°) effective torquer instead of a servomotor to reset the frame. Such a system is theoretically unstable. It can be proven, however, that when there is an axis inclination angle according to the present invention, the system is stable in practice due to the friction which always occurs between the frame and gimbal at the journals of the studs 3a and 3b. The influence of the frictional moment is here particularly great because the theoretical instability occurs at a high resonant frequency.

Figure 6:
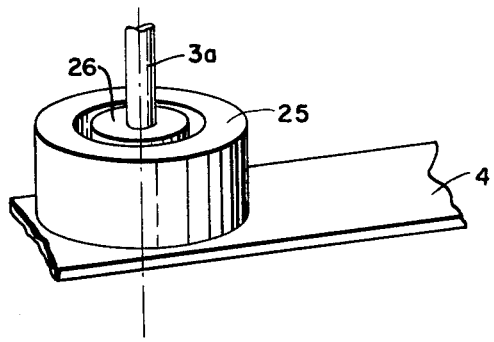
FIG. 6 is a perspective view of a modified drive means for the north-seeking gyro shown in FIG. 4.

In FIG. 6, such a torquer is schematically depicted. The torquer housing 25 is firmly connected to the gyro housing 4, whereas the rotor 26 is attached to the axle 3a of the gyro frame 3. This embodiment of the present invention has particular significance for a so-called tilt-gyro, i.e., a gyro which in a first operational stage seeks north, whose gimbal is then tilted by 90° around its spin axis, and which in a second operational stage functions as a directional gyro. For the directional gyro stage of this instrument, a circularly acting torquer is required. This torquer can thus be utilized in the north-seeking stage for follow-up action without any further modifications.

It must further be noted that the spring constant D of the rate gyro can also be zero with corresponding dimensioning of the axis inclination angle without incurring any loss of the aperiodic damping. The rate frame springs 15 and 16 are therefore not essential to the invention. Thus a quite significant difference from the prior art north-seeking gyro without an axis inclination angle becomes evident.

Finally, new perspectives result with reference to the requirement for vibration-free placement of the north-seeking gyro during the north-seeking process. Vibrations of a vehicle containing a north-seeking gyro always create angular velocities for the gyro with the result that north can not be found. The effect of these vehicular vibrations is greater at lower frequencies. If it is possible to set the inherent frequency of the north-seeking gyro lower than the lowest frequency of the disturbing spectrum, the gyro will find the northerly direction in spite of such vehicular vibrations. Previously it was possible to lower the inherent frequency only by reducing the amplification factor V, which was out of the question because of the associated increase in the north error. According to the present invention, however, the amplification can be predetermined corresponding to the required north accuracy and it is subsequently possible to reduce the inherent frequency by enlarging the axis inclination angle independent of the amplification. Thus disturbing angular velocities of lower frequencies than previously permissible can be dealt with—even though this occurs at the expense of a longer north-seeking period.

It will be understood that the above description of the present invention is susceptible to various modifications, changes, and adaptations, and the same are intended to be comprehended within the meaning and range of equivalents of the appended claims.

We claim:

1. A north-seeking gyroscope, comprising, in combination:
   (a) a housing;
   (b) a frame member journalled within said housing for rotation about a vertical axis with respect to said housing;
   (c) a gimbal member journalled within said frame member for rotation about a major axis which is inclined at a relatively small angle δ with respect to the said vertical axis;
   (d) a gyro rotor journalled within said gimbal member for rotation in a given direction about an axis which is substantially perpendicular to said major axis of said gimbal;
   (e) pick-off means for producing an electrical signal whenever a deflection of said gimbal from a null position with respect to said frame member occurs as the result of a north driving moment caused by the rotation of the earth acting on said major gimbal axis when the gyro rotor axis is aligned in a direction other than north;
   (f) means responsive to said electrical signal for rotating said frame member about its axis to return said frame member to its null position with respect to said gimbal; and,
   (g) the sense of direction of the angle of inclination δ between said vertical frame and major gimbal axes, as measured from said major gimbal axis to said vertical frame axis, coinciding with the direction of rotation of said gyro rotor when the angle δ is measured in the plane defined by said frame and major gimbal axes, said plane being substantially perpendicular to said gyro rotor axis when said gyro rotor axis is aligned with north.

2. A north-seeking gyroscope as defined in claim 1 wherein said pick-off means comprises an angle sensing means coupled between said gimbal member and said frame member, and said means for rotating said frame member comprises servomotor means coupled between said frame member and said housing, and an amplifier having a relatively large amplification factor coupled between said angle sensing means and said servomotor means.

3. A north-seeking gyroscope as defined in claim 1 and further comprising spring means coupled between said gimbal member and said frame member for resiliently urging said gimbal member and said rotor toward said null position with respect to said frame member.

4. A north-seeking gyroscope as defined in claim 1 wheerin said means for rotating the said frame member comprises means for applying a displacement force to said frame which is proportional to the deflection of said gimbal member with respect to said frame member.

5. A north-seeking gyroscope as defined in claim 1 including low friction bearing means mounting said gimbal member in said frame member.

6. A north-seeking gyroscope as defined in claim 5 wherein said bearing means is a gas bearing.

7. A north-seeking gyroscope as defined in claim 1 wherein said means for rotating said frame member comprises means for doubly integrating said electrical signal and applying a torque derived from the result thereof to said frame member.

8. A north-seeking gyroscope as defined in claim 7 wherein said means for doubly integrating said electrical signal and applying a torque to the frame member comprises a circularly effective torquer.

References Cited

UNITED STATES PATENTS

| | | | |
|---|---|---|---|
| 3,122,842 | 3/1964 | Wrigley et al. | 33—226 |
| 3,231,984 | 2/1966 | Howe et al. | 33—226 |
| 3,254,419 | 6/1966 | Hurlburt | 33—226 |
| 3,269,195 | 8/1966 | Cahoon et al. | 74—5.4 |

ROBERT B. HULL, Primary Examiner

UNITED STATES PATENT OFFICE
CERTIFICATE OF CORRECTION

Patent No. 3,518,771     Dated July 7, 1970

Inventor(s) Peter Schultz et al.

It is certified that error appears in the above-identified patent and that said Letters Patent are hereby corrected as shown below:

In the heading to the printed specification, lines 4 to 6, "assignors to Teldix Luftfahart-Ausrustungs G.m.b.H., Heidelberg - Wieblingen, Germany" should read -- assignors to Teldix Gesellschaft mit beschrankter Haftung, Heidelberg, Germany --. Column 1, line 61, "circiut" should read -- circuit --. Column 2, lines 2 and 3, cancel "angular"; line 61, "interconnection" should read -- interconnecting --. Column 4, line 40, "gibal" should read -- gimbal --. Column 5, line 34, after "plane" insert -- so --. Column 6, lines 19, 20, 23 and 25, "$(\gamma-\gamma)$" should read -- $(\gamma_0-\gamma)$ --; line 49, "$-\delta\cos\alpha$" should read -- $-\dot{\gamma}\delta\cos\alpha$ --.

Signed and sealed this 24th day of November 1970.

(SEAL)
Attest:

EDWARD M. FLETCHER, JR.
Attesting Officer

WILLIAM E. SCHUYLER, JR.
Commissioner of Patents